United States Patent [19]
McPheeters et al.

[11] Patent Number: 4,761,349
[45] Date of Patent: Aug. 2, 1988

[54] SOLID OXIDE FUEL CELL WITH MONOLITHIC CORE

[75] Inventors: Charles C. McPheeters, Plainfield; Franklin C. Mrazek, Hickory Hills, both of Ill.

[73] Assignee: University of Chicago, Chicago, Ill.

[21] Appl. No.: 27,929

[22] Filed: Mar. 19, 1987

[51] Int. Cl.⁴ .......................... H01M 8/10; H01M 2/14
[52] U.S. Cl. .......................................... 429/39; 429/30; 429/32; 429/38
[58] Field of Search .......................... 429/30, 32, 37–39

[56] References Cited

U.S. PATENT DOCUMENTS

| | | | |
|---|---|---|---|
| 4,276,355 | 6/1981 | Kothmann et al. | 429/35 X |
| 4,476,196 | 10/1984 | Poeppel et al. | 429/32 |
| 4,476,197 | 10/1984 | Herceg | 429/32 |
| 4,476,198 | 10/1984 | Ackerman et al. | 429/32 |
| 4,510,212 | 4/1985 | Fraioli | 429/30 |

Primary Examiner—Brian E. Hearn
Assistant Examiner—Stephen J. Kalafut
Attorney, Agent, or Firm—Emrich & Dithmar

[57] ABSTRACT

A solid oxide fuel cell in which fuel and oxidant gases undergo an electrochemical reaction to produce an electrical output includes a monolithic core comprised of a corrugated conductive sheet disposed between upper and lower generally flat sheets. The corrugated sheet includes a plurality of spaced, parallel, elongated slots which form a series of closed, linear, first upper and second lower gas flow channels with the upper and lower sheets within which a fuel gas and an oxidant gas respectively flow. Facing ends of the fuel cell are generally V-shaped and provide for fuel and oxidant gas inlet and outlet flow, respectively, and include inlet and outlet gas flow channels which are continuous with the aforementioned upper fuel gas and lower oxidant gas flow channels. The upper and lower flat sheets and the intermediate corrugated sheet are preferably comprised of ceramic materials and are securely coupled together such as by assembly in the green state and sintering together during firing at high temperatures. A potential difference across the fuel cell, or across a stacked array of similar fuel cells, is generated when an oxidant gas such as air and a fuel such as hydrogen gas is directed through the fuel cell at high temperatures, e.g., between 700° C. and 1100° C.

17 Claims, 5 Drawing Sheets

SOLID OXIDE FUEL CELL WITH MONOLITHIC CORE

CONTRACTUAL ORIGIN OF THE INVENTION

The United States Government has rights in this invention under Contract No. W-31-109-ENG-38 between the U.S. Department of Energy and Argonne National Laboratory.

BACKGROUND OF THE INVENTION

This invention relates generally to energy transfer devices such as solid oxide fuel cells and is particularly directed to a monolithic solid oxide fuel cell having a first plurality of spaced linear channels for directing the flow of a gas fuel and a second plurality of spaced linear channels for directing the flow of an oxidizing gas for producing an output voltage when the gas-bearing fuel cell is operated at high temperatures.

A fuel cell is basically a galvanic energy conversion device that chemically combines hydrogen or a hydrocarbon fuel and an oxidant within catalytic confines to produce a DC electrical output. In one form of fuel cell, cathode material defines the passageways for the oxidant and anode material defines the passageways for the fuel, and an electrolyte separates the cathode and anode materials. The fuel and oxidant, typically as gases, are then continuously passed through the cell passageways separated from one another, and unused fuel and oxidant discharged from the fuel cell generally also remove the reaction products and heat generated in the cell. Being infeeds, the fuel and oxidant are typically not considered an integral part of the fuel cell itself.

The type of fuel cell for which this invention has direct applicability is known as the solid electrolyte or solid oxide fuel cell, where the electrolyte is in solid form in the fuel cell. In the solid oxide fuel cell, hydrogen or a hydrocarbon is used as the fuel and oxygen or air is used as the oxidant, and the operating temperature of the fuel cell is between 700° and 1100° C.

The hydrogen reaction on the anode (the negative electrode) with oxide ions generates water with the release of electrons; and the oxygen reaction on the cathode with the electrons effectively forms the oxide ions. Electrons flow from the cathode to the anode. Thus, the reactions are, at the:

cathode $\tfrac{1}{2}O_2 + 2e^- \rightarrow O^{-2}$ (1)

anode $H_2 + O^{-2} \rightarrow H_2O + 2e^-$. (2)

The overall cell reaction is $H_2 + \tfrac{1}{2}O_2 \rightarrow H_2O$ (3)

In addition to hydrogen, the fuel can be derived from a hydrocarbon such as methane ($CH_4$) reformed by exposure to steam at 350° C. or above, which initially produces carbon monoxide (CO) and three molecules of hydrogen. As hydrogen is consumed, a shift in reaction occurs to $CO + H_2O \rightarrow CO_2 + H_2$. (4)

The overall reaction of hydrocarbons in the cell is illustrated by $CH_4 + 2O_2 \rightarrow CO_2 + 2H_2O$ (5)

Inasmuch as the conversion is electrochemical, the thermal limitations of the Carnot cycle are circumvented; therefore efficiencies in the range exceeding 50% fuel heat energy conversion to electrical output can be theoretically obtained. This is much higher than equivalent thermal engines utilizing the same fuel conversion, including even a conventional diesel powered engine.

The electrolyte isolates the fuel and oxidant gases from one another while providing a medium allowing the ionic transfer and voltage buildup across the electrolyte. The electrodes (cathode and anode) provide paths for the internal movement of electrical current within the fuel cell to the cell terminals, which are connected to an external load. The operating voltage across each cell is of the order of 0.7 volts, so the individual cells must be placed in electrical series to obtain a useful load voltage. A series connection is accomplished between adjacent cells with an interconnect material which isolates the fuel and oxidant gases from one another while electrically coupling the anode of one cell to the cathode of an adjoining cell. As the active electrochemical generation of electricity takes place only across the electrolyte portions of the fuel cell, any interconnect separation between the cathode and anode in order to provide the series electrical connection between the cells renders that part of the fuel cell electrically nonproductive. The percentage of interconnect to electrolyte wall area defining each cell, if high, could significantly reduce the energy or power densities of such a fuel cell.

Diffusion of the reacting species (fuel or oxidant) through the electrodes to the electrolyte also limits the cell performance. Fuel and oxidant must diffuse away from the flow in the respective passageways through the electrolyte to the reaction sites. The fuel and oxidant diffuse through the electrodes to the electrolyte and react at (or near) the three-phase boundary of the gases, the electrodes (anode or cathode), and electrolyte, where electrochemical conversion occurs. As the hydrogen partial pressure of the fuel gases decreases along the length of the fuel passageways, less voltage is generated near or at the downstream end of the fuel passageways.

While it is possible to thermally and electrically extract great quantities of energy from the fuel, it is also inherently inefficient to extract such energies to the complete depletion of the fuel and oxidant. Complete conversion of the fuel in the fuel cell is thus not sought as it is intrinsically inefficient in the overall output of the cell voltage. For both a single cell and cells in gas flow series, the maximum theoretical voltage decreases along the cell. Practical fuel cells therefore consume only 80 to 90% of the fuel as the cell voltage decreases rapidly as the hydrogen becomes less than 5% of the fuel gas. The reduction in maximum cell voltage as the fuel is consumed is an important limitation.

One proposed series of solid oxide fuel cells utilizes a ceramic support tube, and the electrodes (anode and cathode) and electrolyte are built up as layers on the support tube. The support tube is confined in a sealed housing, and the fuel and oxidant are manifolded to the housing and the reaction products are ported from the housing as required. Depending on the layer build-up, the fuel is either conveyed internally of the support tube and the oxidant is conveyed externally of the support tube (or vice versa). A practical fuel cell unit would be composed of many such tubes supported within an exterior housing, and manifolding would separate and direct the fuel and oxidant proximate the tubes.

A typical support tube might be formed of calcia stabilized zirconia ($ZrO_2+CaO$); the cathode typically would be applied to the exterior face of the support tube and might be in the form of lanthanum manganite ($LaMnO_3$); the electrolyte would be layered over a portion of the cathode, comprised, for example, of yttria-stabilized zirconia ($ZrO_2+Y_2O_3$); and the anode would be layered over the electrolyte comprised, for example, of a nickel or cobalt yttria-stabilized zirconia cermet or mixture ($Ni,Co+ZrO_2+Y_2O_3$). The oxidant would thereby flow internally of the structural tube while fuel would be circulated externally of the tube. For part of the cell where a series connection was to be made with an adjacent cell, the interconnection would be layered over the cathode at this location instead of the electrolyte and anode, to engage the anode of the adjacent cell. The interconnect might be comprised, for example, of lanthanum chromite ($LaCrO_3$).

To form this type of fuel cell, the support tube must be formed with a high degree of porosity. Even with 40% porosity, the layered anode and cathode represent large diffusion barriers. The diffusion losses increase very steeply at high current densities and represent a limit on current and hence power. The minimum size of the support tube has been about 1 cm in diameter, with a side wall about 1 mm thick. A limiting factor of this support tube core arrangement is the length of path that the current must pass along the cathode and anode materials thereby inducing significant electrical resistant losses. In one effort to minimize this, the respective tubes have been shortened lengthwise and stacked end-to-end on one another, and the anodes and cathodes of the successive respective tubes have been interconnected in a serial fashion with an interconnect. This renders a single tube through which the fuel and/or oxidant passes, while the serial connection produces a higher voltage cumulative of the total number of serially interconnected individual tubes. The current flow is in line with the direction of the fuel and/or oxidant flow, namely axially of the tube configuration.

An alternate construction provides an electrical interconnect at a cordal arc section of the tube connected to the interior anode, for example, whereby adjacent tubes are stacked tangentially adjacent one another to establish a cathode-anode serial arrangement. As the current must pass circumferentially along the cathode and anode materials, significant electrical resistance losses are incurred. Moreover, the tube supports are nonproductive and heavy so that the power and energy densities suffer when compared to other forms of energy conversion, including even the liquid electrolyte fuel cells more commonly operated at lower temperatures.

In many prior designs of solid oxide fuel cells, a feed tube for the oxidant gas must fit witin the oxidant passageway thus requiring that the passageway be sufficiently large to receive the tube. The power density of the fuel cells is related to the cell size, so that reduction in cell size provides for higher power density. Certain prior designs also proposed complicated porting or manifolding of the cells, involving overlays of the materials that require great care in manufacture due to possible warping in the green state of the material layers which, in turn, also generally requires oversizing of the unit to provide for some margin of error should warpage occur and because of the inability to inspect and correct for this shortcoming.

One prior art approach is disclosed in U.S. Pat. No. 4,476,198 entitled "Solid Oxide Fuel Cell Having Monolithic Core", having John P. Ackerman and John E. Young as joint inventors. This patent discloses a monolithically formed core consisting only of materials active in the electrochemical reactions. This means that the electrolyte and interconnect walls of the core would be formed, respectively, only of anode and cathode materials layered on the opposite sides of electrolyte material or on the opposite sides of interconnect material. This allows the use of very thin material layers and very thin resulting composite core walls. The thin composite core walls can be shaped to define small passageways, while yet having sufficient structural integrity to withstand the fluid pressures generated by gas flow through the passageways and the mechanical stresses due to the weight of the stacked core walls on one another. This beneficially increases the power density of the fuel cell because of its reduced size and weight.

U.S. Pat. No. 4,476,197 entitled "Integral Manifolding Structure For Fuel Cell Core Having Parallel Gas Flow", having Joseph E. Herceg as sole inventor, discloses means for directing the fuel and oxidant gases to parallel flow passageways in the core. A core wall projects beyond the open ends of the defined core passageways and is disposed approximately midway between and parallel to the adjacent overlying and underlying interconnect walls to define manifold chambers therebetween on opposite sides of the wall. Each electrolyte wall defining the flow passageways is shaped to blend into an be connected to this wall in order to redirect the corresponding fuel and oxidant passageways to the respective manifold chambers either above or below this intermediate wall. Inlet and outlet connections are made to these separate manifold chambers, respectively, for carrying the fuel and oxidant gases to the core, and for carrying their reaction products away from the core.

U.S. Pat. No. 4,476,196 entitled "Solid Oxide Fuel Cell Having Monolithic Cross Flow Core and Manifolding", having Roger B. Poeppel and Joseph T. Dusek as joint inventors, discloses a monolithic core construction having the flow passageways for the fuel and for the oxidant gases extended transverse to one another, whereby full face core manifolding can be achieved for these gases and their reaction products. The core construction provides that only anode material surround each fuel passageway and only cathode material surround each oxidant passageway, each anode and each cathode material further being sandwiched at spaced opposing sides between electrolyte and interconnect materials. These composite anode and cathode wall structures are further alternately stacked on one another (with the separating electrolyte or interconnect material typically being a single common layer) whereby the fuel and oxidant passageways are disposed transverse to one another.

The U.S. Pat. No. 4,510,212 filed Oct. 12, 1983 entitled "Solid Oxide Fuel Cell Having Compound Cross Flow Gas Patterns", having Anthony V. Fraioli as sole inventor, discloses a core construction having both parallel and cross flow paths for the fuel and the oxidant gases. Each interconnect wall of the cell is formed as a sheet of inert support material having therein spaced small plugs of interconnect material, the cathode and anode materials being formed as layers on opposite sides of each sheet and being electrically contacted together by the plugs of the interconnect material. Each interconnect wall in a wavy shape is connected along spaced generally parallel line-like contact areas between corresponding spaced pairs of generally parallel electrolyte walls, operable to define one tier of generally parallel flow passageways for the fuel and oxidant gases. Alternate tiers are arranged to have the passageways disposed normal to one another. This provides for the solid mechanical connection of the interconnect walls of adjacent tiers to the opposite sides of the common electrolyte wall therebetween only at spaced point-like contact areas, where the previously mentioned line-like contact areas cross one another. The inert support material comprises between 2 and 98 wt. % of the whole core, varied as needed to minimize differential thermal expansion of the composite core wall structures.

The present invention offers various advantages not available in any of the prior art solid oxide fuel cells discussed above. For example, the solid oxide fuel cell of the present invention is comprised of only three components: (1) a pair of flat sheets; and (2) a corrugated sheet positioned between and intimately diffusion bonded with the two flat sheets and forming an integral structure having a plurality of parallel, elongated channels therewith. The corrugated structure of the channel-forming portion of the solid oxide fuel cell provides high strength to withstand the fluid pressures generated by gas flow through the passageways as well as mechanical stresses arising from the high operating temperatures of the fuel cell and the weight of the core walls on one another when a plurality of fuel cells are arranged in a stacked array. This corrugated channel-forming structure, because of its high strength per unit volume, also allows the composite core walls to be extremely thin in reducing the conduction path of the oxygen ions through the electrolyte and thus reducing fuel cell resistance. In addition, not only is the center portion of the fuel cell comprised of active regions, but the fuel intake and outlet manifolds of the cell are also active regions comprised of electrode material and thus allow for electrochemical reactions along the entire fuel cell length for increased energy conversion efficiency. In this manner, the maximum theoretical voltage is maintained substantially along the entire length of the fuel cell which further enhances fuel consumption efficiency. The present invention thus provides a solid oxide fuel cell with a monolithic core which has high structural integrity, is comprised of only three components and thus is easily fabricated and assembled, is easily insulated because of its small size, and also because of its small size and reduced weight provides increased power density.

OBJECTS AND SUMMARY OF THE INVENTION

Accordingly, it is an object of the present invention to provide a high strength, small volume solid oxide or electrolyte fuel cell.

It is another object of the present invention to provided a stacked array of solid electrolyte fuel cells electrically coupled in series wherein each cell or layer is comprised of a corrugated sheet and a flat sheet bonded together so as to form a plurality of linear, parallel, spaced gas carrying channels.

Yet another object of the present invention is to provide a more compact solid electrolyte fuel cell which affords increased power density and higher strength.

A further object of the present invention is to provide a solid oxide fuel cell having a monolithic core integrated with inlet and outlet manifolds which is easily insulated.

A still further object of the present invention is to provide a core for a solid oxide fuel cell comprised of only three components.

Another object of the present invention is to facilitate the fabrication and assembly of a stacked array of solid oxide fuel cells.

The present invention contemplates an integral rigid assembly for the transfer of energy along the entire length of a solid electrolyte fuel cell. The fuel cell includes a generally flat sheet forming the cell interconnection for electrically coupling adjacent cells in series when arranged in a stacked array and further includes a corrugated sheet bonded to one surface of the interconnecting sheet. The corrugated sheet is comprised of thin anode and cathode layers and an electrolyte layer therebetween. The corrugated sheet forms a plurality of spaced, elongated, linear inner channels with the interconnecting sheet with which it is integrated and a plurality of outer channels with the interconnecting sheet of an immediately adjacent cell, where the inner and outer channels are parallel and separated by the anode-electrodecathode corrugated sheet. Opposed ends of the corrugated sheet are provided with respective first and second end corrugations which are coupled to and continuous with the inner channels and form intake and outlet manifolds at respective ends of the fuel cell. The fuel and oxidant gases flow in respective parallel, spaced channels on opposite sides of the corrugated sheet which thus separates the fuel and oxidant gases.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
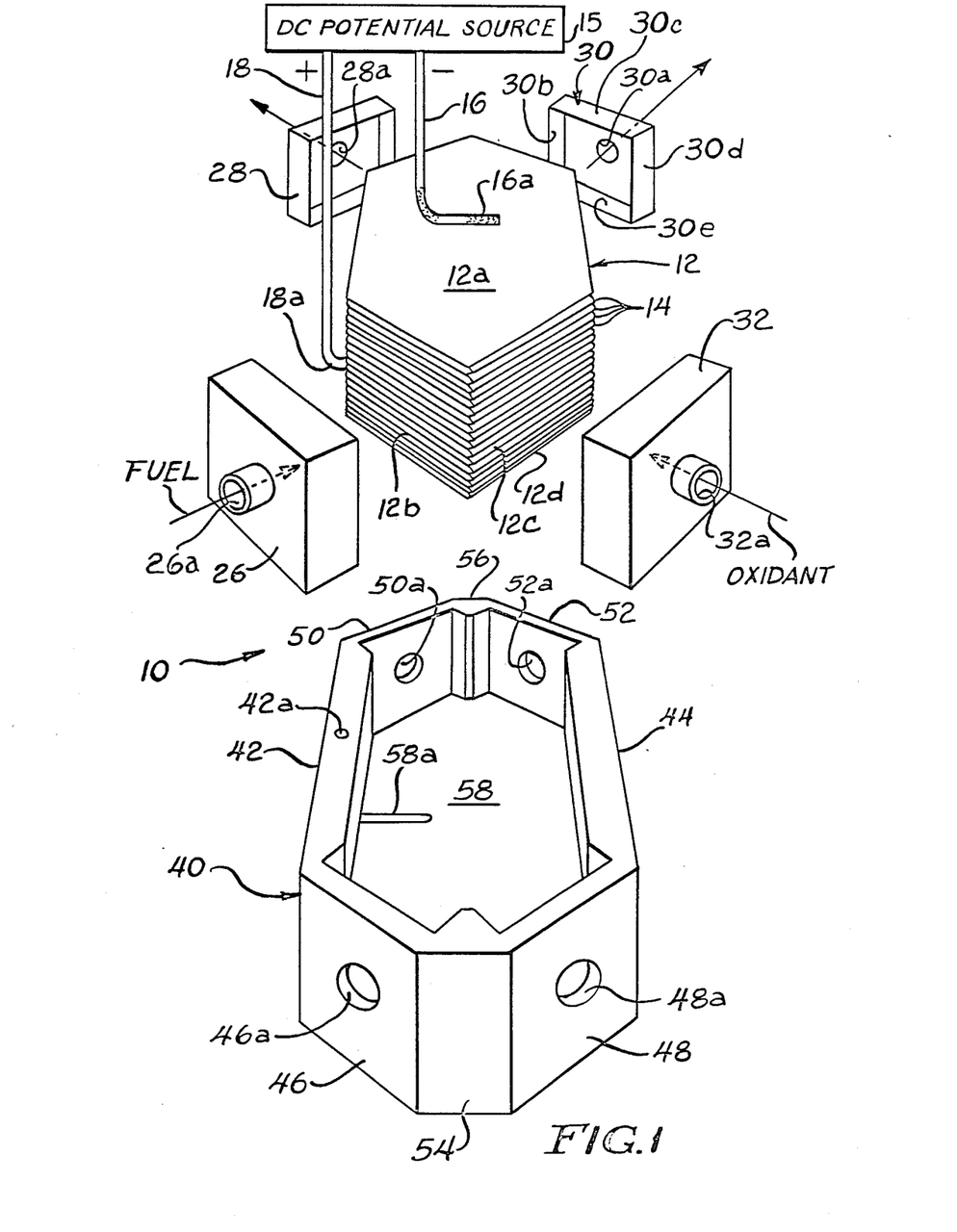
FIG. 1 is an exploded perspective view of a plurality of solid oxide fuel cells each having a monolithic core arranged in a stacked array in accordance with the present invention.

Referring to FIG. 1, there is shown a solid oxide fuel cell 10 with a monolithic core 12 in accordance with the principles of the present invention.

The monolithic core 12 of the fuel cell 10 is comprised of a plurality of stacked core layers 14 each of which is in abutting contact with immediately adjacent identical above and below layers, with the exception of the top and bottom layers 12a, 12d. The top and bottom layers 12a, 12d define the upper and lower layers of the monolithic core 12 and are respectively coupled to first and second conductors 16a and 18a. The first and second conductors 16a, 18a are coupled to an external circuit such as a DC potential source 15 for deriving a DC output voltage from the stacked array of core layers forming the monolithic core 12. The core layers 14 of the monolithic core 12 are electrically coupled in series as described below, with the top core layer 12a coupled to the negative terminal of the DC potential source 155 and the bottom layer 12d coupled to the positive terminal of the DC potential source. It is in this manner that a DC voltage is generated by and output from the stacked array of core layers 14 which form the monolithic core 12.

The monolithic core 12 further includes a first pair of intake lateral surfaces 12b and 12c and a second pair of outlet lateral surfaces which, since they are disposed on the distal portion of the monolithic core 12 as illustrated in FIG. 1, are not shown in this figure. The monolithic core 12 has a generally hexagonal shape when viewed from top or bottom and thus each of the core layers 14 has a similar hexagonal cross sectional shape. The solid oxide fuel cell of the present invention is not limited to this shape, but is capable of operating with virtually any cross sectional shape.

Each of the intake lateral surfaces 12b and 12c as well as each of the outlet lateral surfaces has a generally rectangular shape defined by the adjacent lateral edges of the stacked array of core layers 14. The intake lateral surfaces 12b and 12c are respectively adapted to receive a fuel inlet housing 26 and an oxidant inlet housing 32. Similarly, the outlet lateral surface of the monolithic core on the left when viewed as shown in FIG. 1 is adapted to receive a fuel outlet housing 28 in tight fitting engagement thereon, while the right outlet lateral surface is adapted to receive in tight fitting engagement an oxidant outlet housing 30 positioned thereon. Each of the fuel and oxidant inlet and outlet housings is generally rectangular in shape and includes four panels around the periphery thereof spaced so as to define a recessed portion on the aft, or inner, surface thereof. For example, the oxidant outlet housing 30 includes peripheral panels 30b, 30c, 30d and 30e which are arranged so as to define a recessed portion in the oxidant outlet housing 30. This recessed portion of the oxidant outlet housing 30 is adapted for tight fitting positioning over the oxidant outlet lateral surface of the monolithic core 12 such that the oxidant outlet housing encloses this lateral surface of the monolithic core.

Each of the fuel and oxidant inlet and outlet housing is also provided with a fuel flow channel therein to allow for the passage of a gas through the housing. Thus, the fuel inlet housing 26 is provided with an inlet channel 26a, while the oxidant inlet housing 32 is also provided with an inlet channel 32a. Similarly, the fuel outlet housing 28 is provided with an outlet channel 28a, while the oxidant outlet housing 30 is also provided with an outlet channel 30a. The respective channels or apertures in each of the aforementioned housings allows for either entry into or exit from the monolithic core 12 of either a fuel or oxidant gas. Therefore, the inlet channel 26a in the fuel inlet housing 26 allows for the free flow of a fuel gas and the inlet channel 32a in the oxidant inlet housing 32 allows for the free flow of an oxidant gas into the monolithic core 12. Similarly, outlet channel 28a in the fuel outlet housing 28 allows for exit of the fuel gas while the outlet channel 30a in the oxidant outlet housing 30 allows for escape of the oxidant gas from the monolithic core 12. It is in this manner that the fuel and oxidant gases which are directed into each of the core layers 14 in the monolithic core 12 undergo an electrochemical reaction therein resulting in the generation of energy, with the unreacted by-products of the electrochemical reaction exhausted from the monolithic core 12 and allowed to escape from the solid oxide fuel cell 10.

Disposed about the monolithic core 12 with the aforementioned fuel and oxidant inlet and outlet housings positioned thereon is an outer insulating sheath or housing 40. The insulating housing 40 is preferably comprised of a rigid zirconia, silica or alumina-based material. the outer insulating housing 40 has a generally octagonal outer cross-section when viewed from above and is comprised of a plurality of lateral walls 42, 44, 46, 48, 50, 52, 54 and 56. The insulating housing 40 further includes a bottom panel 58 and a top panel, which is not shown in FIG. 1 for simplicity. With the bottom panel 58 positioned in tight fitting relation upon a lower edge of the generally octagonal shape of the aforementioned lateral walls and the cover panel similarly positioned on an upper edge portion of the lateral walls, the insulating housing 40 provides a completely enclosed structure within which the stacked solid oxide fuel cell 10 is positioned. By completely enclosing the stacked solid oxide fuel cell 10 in an insulating sheath, the high operating temperatures of the fuel cell, e.g., 700° C.–1100° C., may be more easily maintained for efficient fuel cell operation.

In the outer insulating housing 40, lateral wall 46 is provided with a fuel inlet aperture 46a, while lateral wall 48 is provided with an oxidant inlet aperture 48a. Similarly, insulating housing lateral walls 50 and 52 are respectively provided with fuel outlet and oxidant outlet apertures 50a and 52a. Thus, the fuel inlet aperture 46a is adapted to receive inlet channel 26a, while oxidant inlet aperture 48a is adapted to receive inlet channel 32a. Similarly, fuel outlet aperture 50a is adapted to receive the outlet channel 28a, while oxidant outlet aperture 52a is adapted to receive the outlet channel 30a. In this manner, the fuel and oxidant gases are allowed to freely flow into and to be exhausted from the monolithic core 12 of the solid oxide fuel cell 10.

From FIG. 1 it can be seen that facing lateral walls 42 and 44 as well as facing lateral walls 54 and 56 are not provided with apertures therein. However, lateral wall 42 is provided with a slot 42a therein, the lower end of which is positioned immediately adjacent to and is continuous with a linear slot 58a in the bottom panel 58. Slots 42a and 58a, when aligned, are adapted to receive in tight fitting relation the generally L-shaped combination of the second external terminal 18 and the second conductor 18a electrically coupled to the bottom layer 12d of the monolithic core 12. By thus accommodating the second external terminal 18 and the second conductor 18a extending from the monolithic core 12, the outer insulating housing 40 may be disposed in a tight fitting manner about the monolithic core 12 of the solid oxide fuel cell 10. Each of the inner surfaces of lateral walls 46, 48, 50 and 52 is provided with a generally rectangular cutout section extending substantially the length and width of each of these wall sections. Each of the cutout inner portions of the aformentioned lateral walls is thereby adapted to receive in tightfitting relation a respective fuel inlet/outlet housing or oxidant inlet/outlet housing. Thus, the respective cutout inner surfaces of lateral walls 46 and 48 are adapted to receive in tightfitting relation the fuel inlet housing 26 and the oxidant inlet housing 32. Similarly, the respective inner surfaces of lateral walls 50 and 52 are adapted to receive in tightfitting relation the fuel outlet housing 28 and the oxidant outlet housing 30. In a preferred embodiment, the outer insulating housing 40 is comprised of a unitary structure formed of the various aforementioned lateral wall sections in combination with the generally planar top and bottom panels which are adapted for secure coupling to the lateral wall sections by conventional means such as a suitable bonding agent or coupling means.

Figure 2:
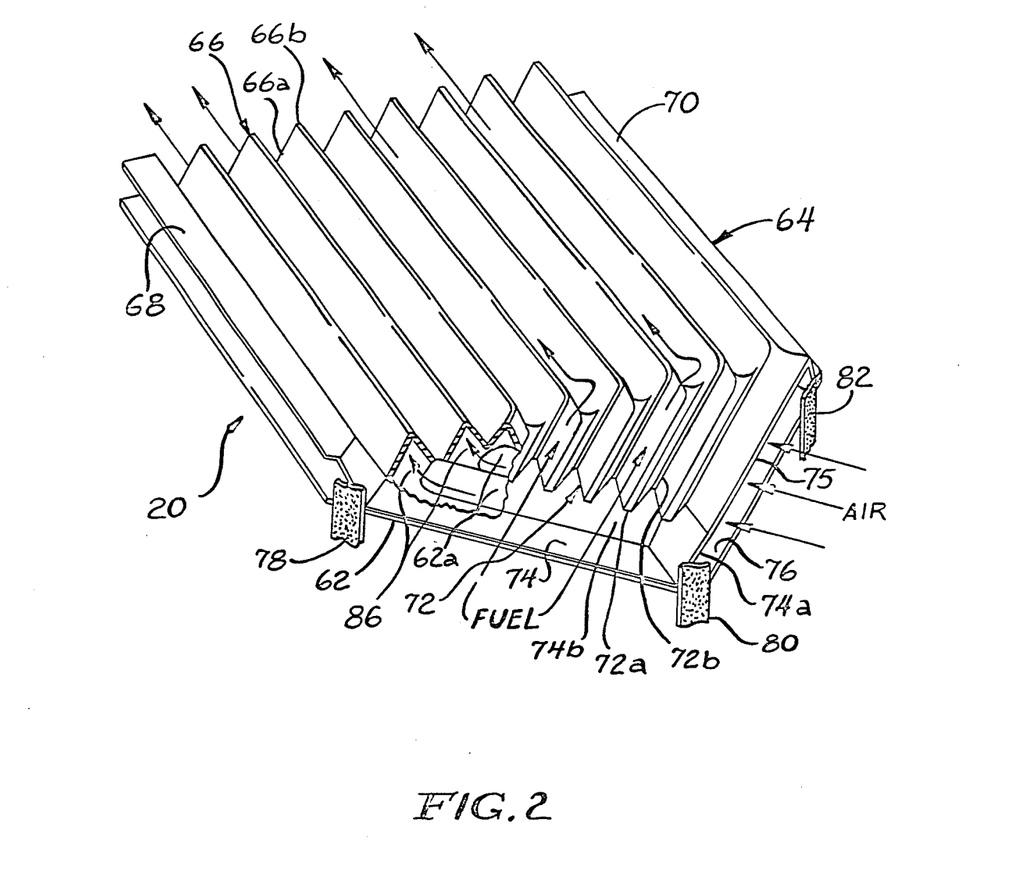
FIG. 2 is a partially cutaway perspective view of a portion of a single solid oxide fuel cell having a monolithic core in accordance with the present invention.
Figure 3:
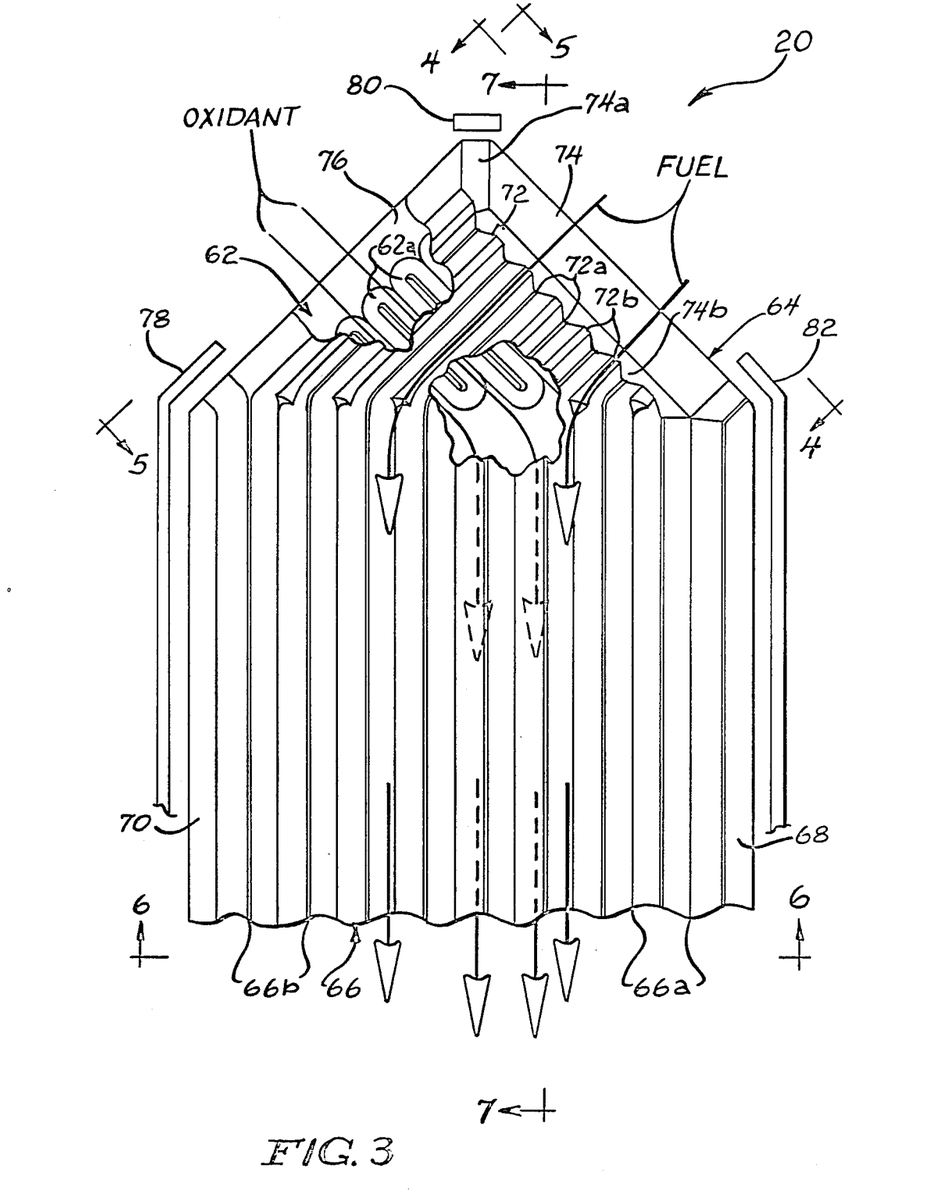
FIG. 3 is a partially cutaway top planar view of a portion of the solid oxide fuel cell illustrated in FIG. 2.

Referring to FIG. 2, there is shown a partially cutaway perspective view of a solid oxide fuel cell 20 forming each of the core layers 14 of the solid oxide fuel cell stacked array 10 of FIG. 1. A partially cutaway top plan view of the solid oxide fuel cell 20 is shown in FIG. 3, while various sectional and end-on views of the solid oxide fuel cell are illustrated in FIGS. 4 through 7.

The solid oxide fuel cell 20 is formed in a generally flat layer and is comprised of an upper corrugated portion 66 and a lower interconnect layer 62. The embodiment of the solid oxide fuel cell 20 shown in the various figures is hexagonal in shape having respective pairs of adjacent edges at each of the ends of its longitudinal axis. Thus, FIG. 3 illustrates only one end portion of the solid oxide fuel cell 20, while a similar structure would be located at its other end portion. The upper corrugated portion 66 of the solid oxide fuel cell 20 includes a pair of opposed end angled corrugated portions 72 and a center portion comprised of a plurality of spaced, parallel, elongated recessed portions 66a and upraised portions 66b extending substantially the entire length of the solid oxide fuel cell and disposed between the aforementioned end portions. Adjacent edge portions on each end of the upper corrugated portion 66 include a lower flat edge 74 and an upper flat edge 75 coupled by an inclined intermediate edge 74a. The lower interconnect layer 62 of the monolithic core 64 of the solid oxide fuel cell 20 is provided with a plurality of spaced, parallel, elongated ribs or ridges 62a positioned adjacent to each of the end portions thereof. The end ridges 62a extend inwardly toward the upper corrugated portions 66 of the monolithic core 64 such that the recessed areas between these end ridges are aligned and continuous with the elongated recessed portions on the lower surface of the upper corrugated portion 66 of the solid oxide fuel cell.

Figure 4:
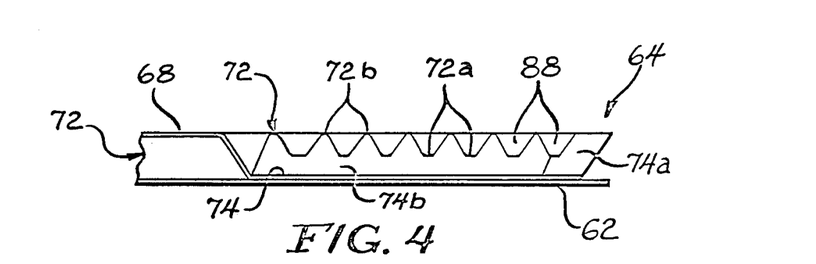
FIG. 4 is an end-on view of the solid oxide fuel cell shown in FIG. 3 taken along sight line 4—4 therein.
Figure 5:
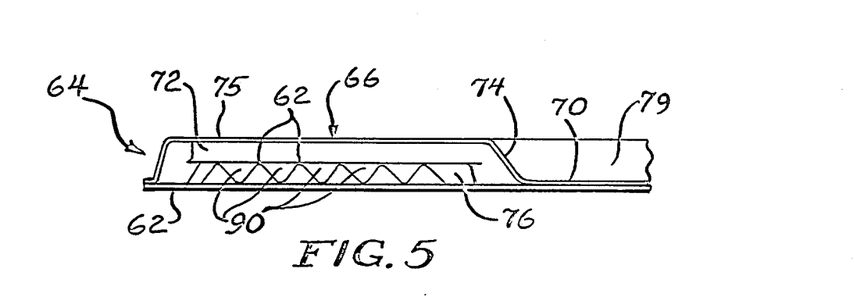
FIG. 5 is an end-on view of the solid oxide fuel cell shown in FIG. 3 taken along sight line 5—5 therein.
Figure 6:
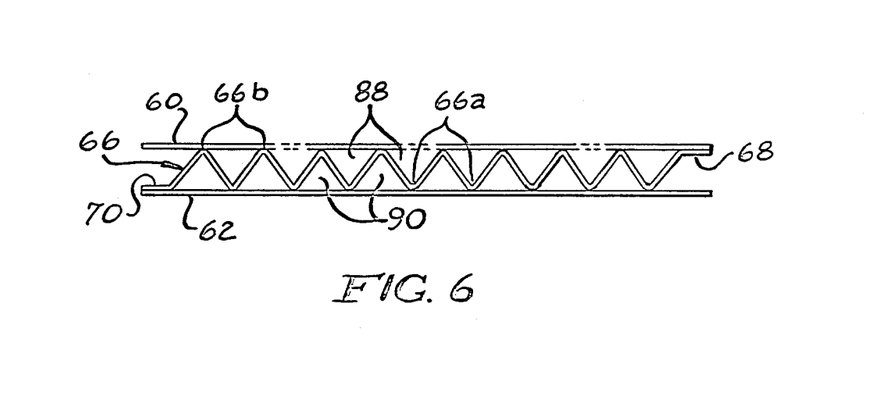
FIG. 6 is a transverse sectional view of the solid oxide fuel cell shown in FIG. 3 taken along sight line 6—6 therein.
Figure 7:
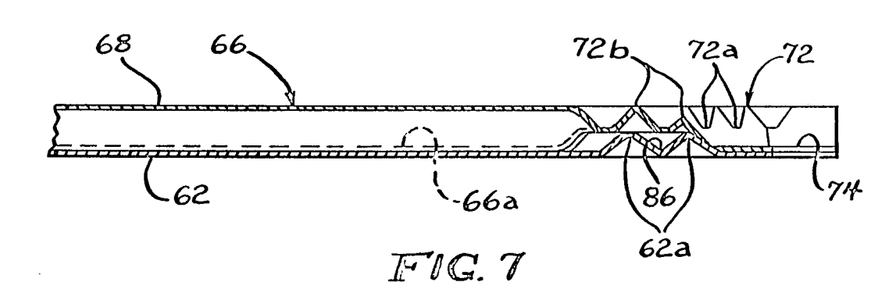
FIG. 7 is a sectional view of the solid oxide fuel cell shown in FIG. 3 taken along sight line 7—7 therein.

A fuel gas is introduced into the monolithic core 64 immediately adjacent to and above the lower flat edge 74 of the upper corrugated portion 66 of the fuel cell. The fuel gas thus introduced is directed in between the upraised portions 72b of the end angled corrugated portion 72 so as to flow in the recessed portions 72a thereof. It should be noted that positioned immediately above and securely bonded to the upper corrugated portion 66 at the upraised portions 66b thereof is an upper interconnect layer 60, as shown in FIG. 6, which is identical in shape and configuration to the lower interconnect layer 62. It is in this manner that the fuel gas introduced into the monolithic core 64 is confined to the recessed portions 72a of the end angled corrugated portion 72. Each of the recessed and upraised portions 72a and 72b of the end angled corrugated extension 72 is aligned and continuous with a corresponding recessed portion 66a and upraised portion 66b of the upper corrugated section 66. Thus, with the respective recessed and upraised portions of the end angled corrugated extension 72 and the center portion of the upper corrugated section 66 aligned and continuous with each other, fuel introduced into a channel 88 in the end angled corrugated extension, as shown in FIG. 4, will flow into a corresponding fuel flow channel 88 in the intermediate portion of the upper corrugated section 66 as shown in FIG. 6.

An oxidant gas is introduced into the monolithic core 64 immediately adjacent to and beneath the upper flat edge 75 thereof. The oxidant gas is then directed through a plurality of spaced, parallel oxidant channels 90 (FIG. 5) formed by the end ridges 62a within the lower interconnect layer 62. Each of the end ridges 62a is positioed adjacent to a respective parallel, spaced channel on the lower side of the corrugated section 66 such that an oxidant gas introduced into the oxidant channels 90 in an edge portion of the monolithic core 64 will flow into corresponding respective oxidant flow channels 90 in the intermediate, or main, portion of the upper corrugated section 66 as shown by the direction of flow arrows in FIG. 3, where the oxidant gas flow lines are shown partially in dotted line form. A similar arrangement of end ridges (not shown) is disposed at the opposite end of the lower interconnect layer 62 so as to receive the oxidant gas from the oxidant flow channels 90 in the intermediate portion of the monolithic core 64 in providing for the exhaust of the oxidant gas therefrom. Similarly, the opposed end of the upper corrugated section 66 (which is not illustrated in FIG. 3) is provided with an end angled corrugated extension which is adapted to receive unconsumed fuel from the fuel flow channels 88 and to provide for exhaust of such unconsumed fuel therefrom.

Referring to FIGS. 4, 5, 6 and 7, it can be seen that the depth of the end ridges 62a in the lower interconnect layer 62 and the depth of the recessed portions 72a in the end angled corrugated extension 72 extend for only one half the depth of the monolithic core 64 and are thus only one half the depth of the recessed portions 66a in the upper corrugated section 66 of the fuel cell. The relative depth of the fuel and oxidant gas inlet and outlet channels in the respective ends of the monolithic core 64 arises from the overlapped arrangement of the recessed portions 62a in the end angled corrugated extension 72 and the end ridges 62a in the lower interconnect layer 62. By thus overlapping the fuel and oxidant inlet and outlet channels while providing for their separation in closely spaced relation, the volume of the solid oxide fuel cell 20 is minimized and an associated increase in fuel cell power density is realized.

As shown in FIG. 3, first and second seals 78 and 82 extend substantially along the entire length of the facing, lateral edges of the solid oxide fuel cell 20 to ensure that the oxidant and fuel gases remain confined within the respective flow channels therein. A third seal 80 is disposed generally transverse to the plane of the solid oxide fuel cell 20 and provides for separation between the inlet and outlet flow paths of the oxidant and fuel gases. Each of the first, second and third seals 78, 82 and 80 is disposed in tightfitting relation between the monolithic core 64 of the solid oxide fuel cell 20 and its outer insulating housing or sheath 40. From FIG. 6, it can be seen that the first lateral sealing flange 68 of the upper corrugated section 66 is adapted for bonding with the upper interconnect layer 60. The second lateral sealing flange 70 is similarly adapted for bonding with the lower interconnect layer 62. In this manner, flow of the oxidant and fuel gases is confined to the respective channels within the monolithic core 64. Bonding may be accomplished by assembling the combination in the green state and sintering the combination together at high temperatures.

Figure 8:
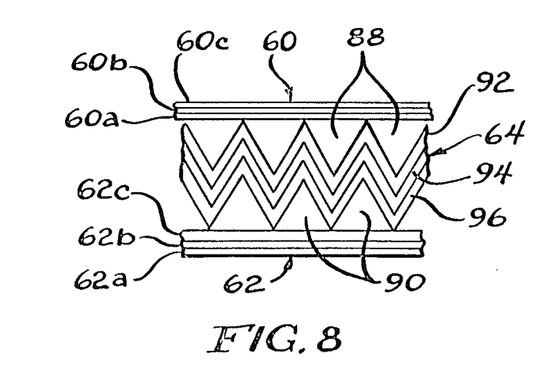
FIG. 8 is a partial sectional view of the monolithic core of the solid oxide fuel cell of the present invention.

Referring to FIG. 8, there is shown a partial sectional view of the corrugated monolithic core 64 disposed between the upper and lower interconnect layers 60 and 62. As shown in the figure, each of the aforementioned structures is multi-layered. Thus, the corrugated monolithic core 64 is comprised of an upper anode layer 92, a lower cathode layer 96, and an intermediate electrolyte layer 94 disposed therebetween. Similarly, the upper interconnect layer 60 is comprised of a lower anode layer 60a, an upper cathode layer 60c, and an intermediate electrolyte layer 60b. The lower interconnect layer 62 is similarly provided with an upper cathode layer 62c, a lower anode layer 62a, and an intermediate electrolyte layer 62b. Each of the fuel carrying channels 88 is thus disposed between the anode layer 92 of the corrugated monolithic core 64 and the anode 60a of the upper interconnect layer 60, while each of the oxidant carrying channels 90 is disposed between the cathode layer 96 of the corrugated monolithic core and the cathode layer 62c of the lower interconnect layer 62. the electrolyte layer 94 of the corrugated monolithic core 64 insulates anode 92 and cathode 96 from one another with respect to electron flow, but permits oxygen ions produced in the oxidant flow channels 90 to flow from the cathode to the anode. Electrons flow from the anode 92 via the upper interconnect layer 60 and thence through the appropriate conductors as illustrated in FIG. 1 to the DC potential source 15 in generating a DC output voltage from the fuel cell. The cathode material is preferably comprised of strontium doped lanthanum manganate $(La(Sr)MnO_3)$. The electrolyte material is preferably comprised of yttria or calcia stabilized zirconia, while the anode layer is preferably comprised of nickel or cobalt zirconia cermet.

The operation of the solid oxide fuel cell is initiated by burning the injected fuel in the presence of the oxidant gas. Burning is typically initiated by conventional means well known to those skilled in the art. After combustion of the fuel is initiated and the temperature of the solid oxide fuel cell is raised to the range of 700° to 1100° C., combustion of the fuel is terminated and the fuel cell operating temperature is maintained by internal resistance heating of the various fuel cell components by the production of electrical power. At temperatures in the range of 700° to 1100° C., the resistivity of the fuel cell components is low enough to allow initiation of an electrochemical reaction involving the chemical combination of hydrogen or a hydrocarbon fuel and the oxidant gas within the catalytic confines of the fuel cell to produce a DC electrical output. Oxidant gas flow through the solid oxide fuel cell is regulated in order to control the fuel cell operating temperature. The conductive nature of the interconnect layers permits solid oxide fuel cells in accordance with the present invention to be arranged in a stacked array wherein each of the fuel cells is electrically coupled in series in the array so as to produce a DC output voltage of the desired magnitude. The present invention envisions stacking large numbers, i.e., as many as 100 or more, of the inventive solid oxide fuel cells in such an array to provide a DC output voltage of the desired magnitude.

There has thus been shown a solid oxide fuel cell employing a monolithic core which is compact, of high strength and low electrical resistance, and provides high power density. The monolithic core of the fuel cell is comprised of an intermediate corrugated layer disposed between and bonded to upper and lower interconnect layers. The corrugations of the intermediate layer in combination with a plurality of spaced ridges in opposed inlet and outlet ends of the core provide for fuel and oxidant gas flow through channels separated by the corrugations of the intermediate layer. The intermediate corrugated layer and the generally planar upper and lower interconnect layers are multi-layered structures, each comprised of an anode layer, a cathode layer, and an electrolyte layer disposed therebetween. The flow of oxygen ions from the oxidant gas via the cathode and through the electrolyte to the anode in the intermediate layer and the flow of electrons in an external circuit coupled between the upper and lower interconnect layers results in a DC voltage being produced in the external circuit and the output of power from the fuel cell. The compact size of the solid oxide fuel cell also facilitates insulating the fuel cell with a surrounding insulating cover or sheath to permit the fuel cell operating temperature to be more easily maintained and the DC output voltage to be more efficiently produced.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A solid oxide fuel cell for electrochemically reacting a flowing fuel gas with a flowing oxidant gas at an elevated temperature in producing a DC output voltage, said solid oxide fuel cell comprising:
 a thin, generally planar, conductive sheet having a plurality of elongated corrugations along the length thereof and comprised of thin layers of anode and cathode materials and a thin layer of ion conducting electrolyte disposed therebetween, said corrugations forming first and second pluralities of spaced, parallel flow channels on respective first and second opposed surfaces of said conductive sheet, said conductive sheet further including fuel and oxidant gas inlet means at a first edge thereof, for respectively directing a fuel gas into said first flow channels and an oxidant gas into said second flow channels, and fuel and oxidant gas outlet means at a second, opposed edge of said conductive sheet for respectively directing unreacted fuel and oxidant gases out of said solid oxide fuel cell, wherein each of said elongated corrugations of said conductive sheet is comprised of a first intermediate corrugation section and second and third end corrugation sections each coupled to a respective end of said intermediate corrugation section and continuous and forming an angle therewith; and first and second electron conducting interconnecting layers respectively disposed immediately above and below said conductive sheet and bonded to the corrugations thereof so as to confine the fuel gas and the oxidant gas within said first and second flow channels, respectively, and to direct unreacted fuel and oxidant gases flowing in said first and second flow channels out of said solid oxide fuel cell, wherein the DC output voltage is produced across said first and second interconnecting layers, wherein one of said interconnecting layers includes first and second pluralities of spaced, paralle ribs at respective ends thereof which are respectively aligned generally transverse to said second and third end corrugation sections and form therewith said fuel and oxidant gas inlet and outlet means including respective inlet and outlet channels each having a depth approximately one-half that of said first and second flow channels to permit said fuel and oxidant gas inlet channels and said fuel and oxidant gas outlet channels to be arranged in an overlapping manner.

2. The solid oxide fuel cell of claim 1 wherein each of said fuel and oxidant gas inlet and outlet means further includes respective deflection means for deflecting said fuel gas and said oxidant gas into said first and second flow channels, respectively.

3. The solid oxide fuel cell of claim 1 wherein said conductive sheet further includes first and second sealing flanges disposed on third and fourth opposed edges thereof for respectively engaging said first and second interconnecting layers in a sealed manner.

4. The solid oxide fuel cell of claim 1 further comprising an external circuit coupled between said first and second interconnecting layers and wherein said DC output voltage is produced in said external circuit.

5. The solid oxide fuel cell of claim 1 wherein each of said first and second interconnecting layers is comprised of respective anode, cathode and electrolyte layers and wherein said electrolyte layer is disposed between said anode and cathode layers.

6. The solid oxide fuel cell of claim 5 wherein the respective anode layers of said corrugated sheet and said first interconnecting layer are bonded together in electrical contact and the respective cathode layers of said corrugated sheet and said second interconnecting layer are bonded together in electrical contact.

7. The solid oxide fuel cell of claim 6 wherein the anode layers of said corrugated sheet and said first and second interconnecting layers are comprised of nickel or cobalt zirconia cermet.

8. The solid oxide fuel cell of claim 6 wherein the cathode layers of said corrugated sheet and said first and second interconnecting layers are comprised of strontium doped lanthanum manganite or magnesium doped lanthanum chromite.

9. The solid oxide fuel cell of claim 6 wherein the electrolyte layers of said corrugated sheet and said first and second interconnecting layers are comprised of yttria stabilized zirconia.

10. The solid oxide fuel cell of claim 1 further comprising an insulating sheath disposed in tight fitting relation about said solid oxide fuel cell.

11. The solid oxide fuel cell of claim 1 further comprising a plurality of conductive sheets and first and second interconnecting layers arranged in a stacked array.

12. The solid oxide fuel cell of claim 11 further comprising an insulating sheath disposed in tight fitting relation about said stacked array of solid oxide fuel cells.

13. The solid oxide fuel cell of claim 12 wherein said insulating sheath includes a continuous lateral wall formed of a plurality of joined sections and top and bottom panels coupled to and in abutting contact with an upper and a lower edge of said continuous lateral wall, respectively.

14. The solid oxide fuel cell of claim 13 further comprising a first pair of inlet housings and a second pair of outlet housings respectively positioned over said fuel and oxidant gas inlets and outlets and having gas flow channels disposed therein.

15. The solid oxide fuel cell of claim 14 wherein each of said gas flow channels in said inlet and outlet housings extends through a respective, immediately adjacent section of the lateral wall of said insulating sheath in contact therewith.

16. The solid oxide fuel cell of claim 12 wherein said insulating sheath is comprised of zirconia, silica or alumina.

17. The solid oxide fuel cell of claim 12 further comprising a plurality of seals disposed between said insulating sheath and said stacked array of solid oxide fuel cells.

* * * * *